United States Patent [19]
Isobe

[11] Patent Number: 5,317,146
[45] Date of Patent: May 31, 1994

[54] READ HEAD INCORPORATING AN IMAGE PICK-UP FUNCTION

[75] Inventor: Minoru Isobe, Tokyo, Japan

[73] Assignee: OKI Electric Industry Co., Ltd., Tokyo, Japan

[21] Appl. No.: 975,492

[22] Filed: Nov. 10, 1992

[30] Foreign Application Priority Data

Nov. 18, 1991 [JP] Japan .................................. 3-301847

[51] Int. Cl.⁵ ............................................ H01J 40/14
[52] U.S. Cl. .................................. 250/208.1; 358/483
[58] Field of Search ............. 250/208.1, 208.2, 227.11, 250/227.20, 552; 358/482, 483, 484, 494, 496, 213.11, 213.13, 212

[56] References Cited

U.S. PATENT DOCUMENTS

| | | | |
|---|---|---|---|
| 4,675,534 | 6/1987 | Sekimura et al. | 250/208.1 |
| 4,791,493 | 12/1988 | Ogura et al. | 358/294 |
| 4,920,431 | 4/1990 | Ogura et al. | 358/496 |
| 5,081,346 | 1/1992 | Narabu et al. | 250/208.1 |
| 5,105,238 | 4/1992 | Nikaido et al. | 357/19 |
| 5,164,580 | 11/1992 | Funada et al. | 250/208.1 |
| 5,214,273 | 5/1993 | Yokochi | 250/208.1 |

FOREIGN PATENT DOCUMENTS 0420644 4/1991 European Pat. Off. .
3527300 2/1986 Fed. Rep. of Germany .

OTHER PUBLICATIONS

S. Yamada et al., "Optical Scanning Image Sensor"; *Electronics and Communications in Japan;* vol. 71; Nov. 1988; pp. 86-94.

K. Komiya et al., "A 2048-Element Contact Type Linear Image Sensor For Facsimile"; *International Electron Devices Meeting, Technical Digest;* Dec. 1981; pp. 309-312.

*Primary Examiner*—David C. Nelms
*Assistant Examiner*—John R. Lee
*Attorney, Agent, or Firm*—Panitch Schwarze Jacobs & Nadel

[57] ABSTRACT

A read head incorporating an image pick-up function includes a photoelectric conversion type light receiving arrays arranged on a substrate, for reading a medium, a convergent rod lens array arranged adjacent the light emitting element arrays, and a solid light emitting element of a surface emission type arranged in the vicinity of the convergent rod lens array.

12 Claims, 5 Drawing Sheets

RELATED ART

READ HEAD INCORPORATING AN IMAGE PICK-UP FUNCTION

BACKGROUND OF THE INVENTION

1) Field of the Invention

The present invention relates to a read head incorporating an image reading function.

2) Related Art of the Invention

Read heads have been widely used for facsimile systems, copying machines and the like. A conventional read head, for example, as shown in FIG. 7, is composed of a fluorescent tube 12 for illuminating a script 11, a convergent rod lens array 13, and a light receiving substrate 14 on which a plurality of light receiving elements 14b are mounted and arranged linearly. Since this kind of read heads have to use, as a light source, a fluorescent tube having a diameter of about 6 mm at most, the miniaturization thereof has been difficult. Even if light emitting diodes are used as a light source, there has been offered a disadvantage in that the distance between the light source and a medium to be read becomes longer.

These years, there has been a demand for a read head having a reading sensitivity which is linear with respect to the density of an image in order to read an image graph or an image having a density gradation from a medium to be read. Accordingly, it has been required to provide a read head which can irradiate light having a sufficient intensity to the medium to be read.

SUMMARY OF THE INVENTION

An object of the present invention is to provide a miniature read head.

Another object of the present invention is to provide a read head which can irradiate light having a sufficient intensity to a medium to be read.

A read head according to the present invention is characterized by a photoelectric conversion type light receiving array set on a substrate, for reading a medium to be read, a convergent rod lens array positioned in opposite to the light receiving array, and a surface emission type solid light emitting elements arranged in the vicinity of the end face of the convergent rod lens array on the side near to the medium to be read.

Further, the read head according to another aspect of the present invention is characterized by a photoelectric conversion type light receiving array arranged and sealed on a substrate for reading a medium to be read, a convergent rod lens array arranged adjacent to the light receiving array, and a surface emission type solid light emitting elements arranged in the vicinity of the end face of the convergent rod lens array on the side near to the medium to be read.

DESCRIPTION OF THE PREFERRED EMBODIMENT

Figure 1:
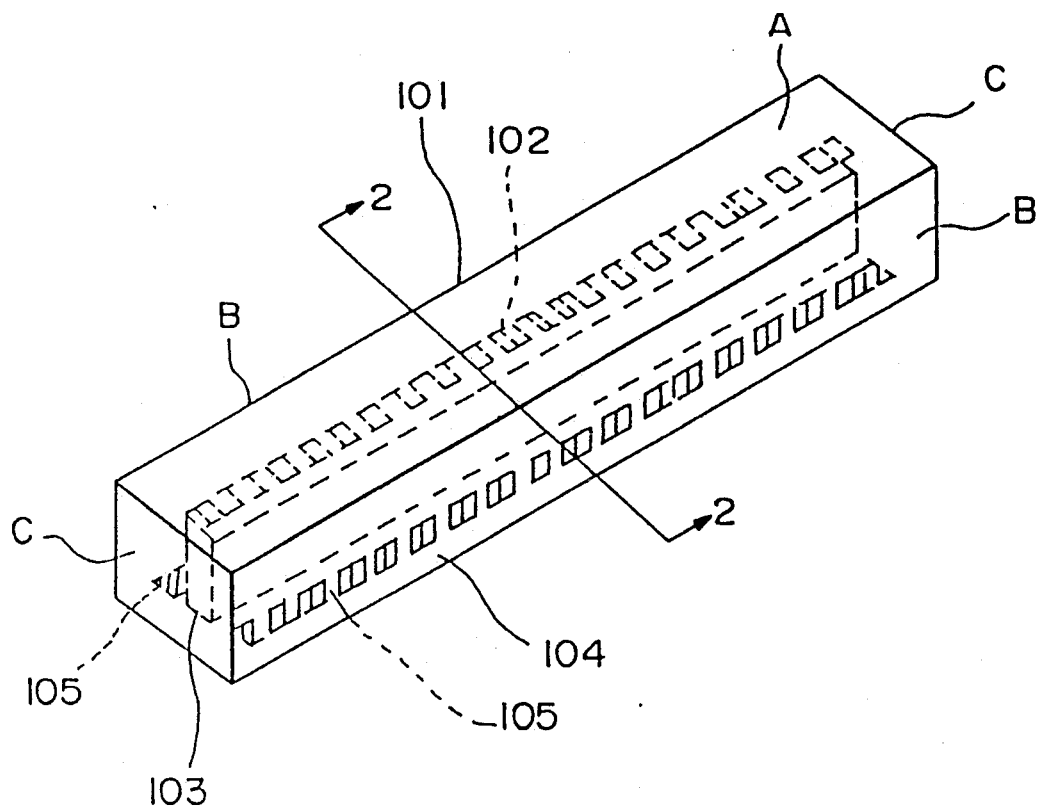
FIG. 1 is a perspective view illustrating an essential part of a first embodiment of a read head according to the present invention.

FIG. 1 is a perspective view illustrating an essential part of a read head according to the present invention. A read head 101 whose an upper surface A and side surfaces B, C are shielded by synthetic resin such as plastic, glass epoxy resin, or the like. A plurality of light receiving element arrays 102 are arranged in one row on the substrate at the upper surface A. A convergent rod lens array 103 is laid below the light receiving element arrays 102. The lower surface of the read head 101 are sealed by a transparent member 104 such as a glass pane. EL (electroluminescence) light emitting elements 105 which are solid light emitting elements are arranged, in two parallel rows longitudinal of the read head 101, on the upper surface of the glass pane 104. It is noted that the read head 101 is electrically connected to a control section (which is not shown) for controlling the operation of the read head 101 through terminals or lead wires (not shown).

Figure 2:
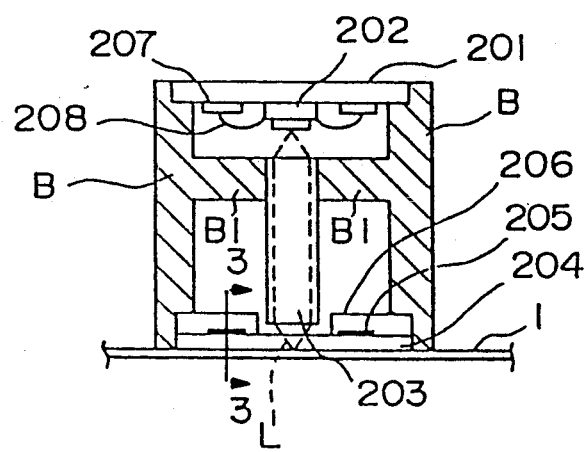
FIG. 2 is a sectional view illustrating an essential part of the first embodiment of the read head according to the present invention.

Referring to FIG. 2 which is a sectional view along the line 2—2 in FIG. 1, illustrating the read head 101 in detail, a substrate 201 made of glass epoxy resin, ceramic or the like is attached to the upper surface A of the read head 101. Light receiving element arrays 202 are arranged on the substrate 201. Each light receiving element array 202 is connected to a terminal section 207 through wire bondings 208. A convergent rod lens array 203 is laid below the light receiving element arrays 202, and is supported and secured by support branches B1 of side surfaces B made of synthetic resin such as plastic.

A transparent glass pane 204 is laid at the lower surface of the read head 101, and is adapted to make contact with or to be adjacent to a script 1 to be read upon reading thereof. Further, EL light emitting elements 205 which are solid light emitting elements are arranged on the upper surface of the transparent glass pane 204, and is covered thereover with a protective insulator layer 206. It is noted that the broken line L denotes an optical axis.

Explanation will be made of operation of the read head as mentioned above. Upon reading of a script 1 to be read, the script 1 is conveyed by a drive means (not shown), and the read head is moved above the script so as to initiate the reading thereof. When EL light emitting elements 205 are turned on by a control circuit (not shown), so as to emit light that transmits through the transparent glass 204, the script 1 which makes contact with or is adjacent to the glass pane 204 is irradiated with the light. The light irradiated onto the script 1 is reflected and is then transmitted through the convergent rod lens array 203. The reflected light then finally reaches the light receiving element arrays 202 which therefore detects the reflected light having reached and converts its into electric signals that are then transmitted to the control section (not shown).

Figure 3:
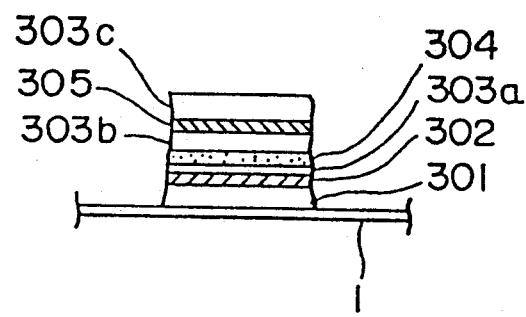
FIG. 3 is a sectional view illustrating an EL light emitting element according to the present invention.

Referring to FIG. 3 which is a sectional view along line 3—3 in FIG. 2, the structure of the EL light emitting elements 202 will be detailed. In FIG. 3, a transparent protective insulator layer 301 as the part of the read head 101 which make contact with a script to be read, corresponds to the transparent glass pane 204 shown in FIG. 2. A transparent electrode 302 is formed over the upper surface of the transparent protective insulator layer 301, and a transparent insulator layer 303a is laid over the transparent electrode layer 302. Further, the light emitting material layer 304 is covered with a transparent insulator layer 303b, and an aluminum electrode 305 is deposited by evaporation on the upper surface of the transparent insulator layer 303b which is insulated and protected by a protective insulator layer 303c. When a drive signal is applied between the transparent electrode 302 and the aluminum electrode 305, the thus formed EL light emitting elements 205 held between these electrodes emit light. The emitted light reaches the script 1 to be read after transmitting through the transparent insulator 303a, the transparent electrode 302 and the glass pane which is a protective insulator layer 301.

The thus formed light emitting elements are incorporated in the read head shown in FIG. 2. With this arrangement, a light source can be arranged adjacent to the script 1 to be read, and accordingly, there can be obtained a technical effect and advantage in that a read head which can irradiate light onto a point on the script with an uniform intensity without the necessity of a large light volume can be provided. Further, since the read head is sealed by the cover and the transparent glass pane so that a miniature read head which is excellent in sealing ability, can be provided, there can be obtained another technical effect and advantage in that a read head which has a long use life and which prevents lead wires, light receiving elements, wire bondings or wires themselves for an amplifier or the like from being deteriorated or corroded.

Next explanation will be made of various embodiments of the reading head according to the present invention which has been already explained with reference to FIG. 2. Since the principal structure of the EL emitting element is similar to the first embodiment, detailed description thereto is abbreviated, but explanation will be made by using the like reference numerals to those used in the first embodiment as necessary. A second embodiment will be made with reference to FIG. 4. As understood from FIG. 4, the second embodiment differs from the first embodiment shown in FIG. 2 in view of the following points. That is, in the first embodiment, the convergent rod lens array 203 is supported and secured by the support branches B1 projected from the side faces Bv made of synthetic resin such as plastic. However, in the second embodiment, the protective insulator layer 303c (which corresponds to the protective insulator layer shown in FIG. 2) which is one of members constituting the EL light emitting elements 205 is bonded to the side surfaces of the convergent rod lens array 203 or the end face of the convergent rod lens array on the side near to the script to be read is bonded and secured to the transparent glass pane in order to support and secure the convergent rod lens arrays 203. Thereby it is possible to provide a read head capable of setting a focus point with no adjustment, only by bonding and securing the EL light emitting elements secured thereto with the convergent rod lens array 203 to the side surfaces B made of synthetic resin such as plastic at predetermined positions.

Figure 4:
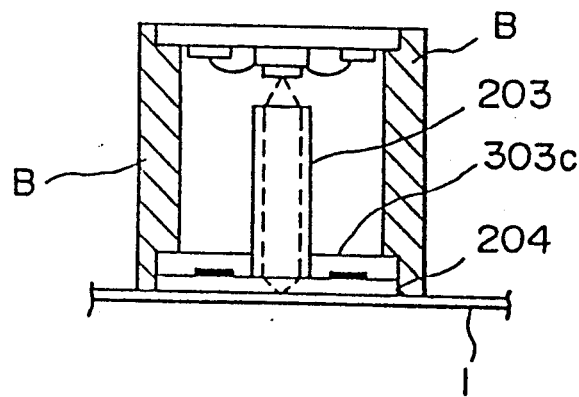
FIG. 4 is a sectional view illustrating a second embodiment of the reading head according to the present invention.
Figure 5A:
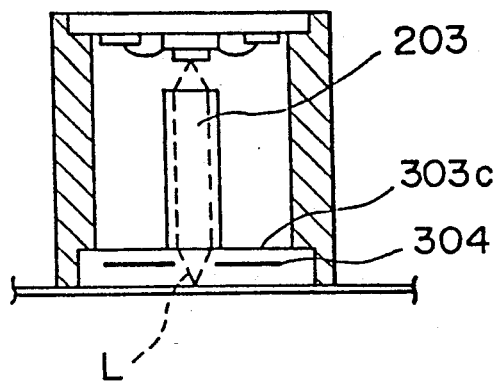
FIGS. 5(a) and 5(b) are sectional views illustrating a third embodiment of the read head according to the present invention.
Figure 5B:
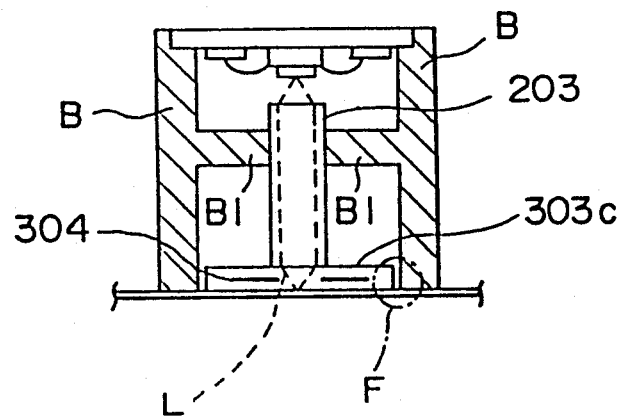

FIGS. 5(a) and 5(b) are views illustrating a third embodiment, in which the read head according to the present invention differs in part from those explained with the use of FIGS. 2 and 4. Referring to FIG. 5(a) which is an explanatory view showing the third embodiment of the read head, the script side end face of the convergent rod lens array 203 is bonded and secured to the upper surface of the protective insulator layer 303c. Further, the left and right light emitting material layers 304 of the EL light emitting element 205 are extended toward the center up to positions where they do not block the lens optical axis L. With this arrangement of the read head in which a position to be read and the light source can be set approaching together, there is exhibited a technical effect and advantage in that the light volume for irradiation to a medium can be remarkably increased in comparison with those of the read heads explained in the first and second embodiments.

Further, referring to FIG. 5(b) is a views illustrating a developed form of the read head in the third embodiment of the present invention, the script side end face of the convergent rod lens array 203 is bonded and secured to the upper surface of the protective insulator layer 303c, similar to the read head in the third embodiment, and further, the convergent rod lens array 203 is bonded and secured to the support branches B1 projected from the side faces B made of synthetic resin such as plastic, as explained in the first embodiment. Accordingly, the embodiment shown in FIG. 5(b) exhibits technical effects and advantages the same as that given by the read head in the third embodiment shown in FIG. 5a, and further, since the EL light emitting elements 205 are bonded and secured to the convergent rod lens array 203 bonded and secured to the support branches B1. It is not necessary to enhance the accuracy of assembly of a part F shown in FIG. 5(b). That is, even though a gap is more or less present in the part F, the above-mentioned structure can seal up lead wires, light emitting elements, bonding parts for amplifiers or the like in view of the provision of the side faces B and the support branches B1.

Another embodiments of the present invention which are further developed from the above-mentioned embodiments will be explained with reference to FIGS. 6(a) to 6(c).

In all embodiments which will be explained hereinbelow, the convergent rod lens array or the solid light emitting elements can be stably and easily supported and secured to the light receiving elements with less adjustment, and further, the convergent rod lens array and the solid light emitting elements can be incorporated with each other in one unit body, thereby it is possible to provide a miniature read head with a high degree of manufacturing accuracy, which can be easily handled.

Figure 6A:
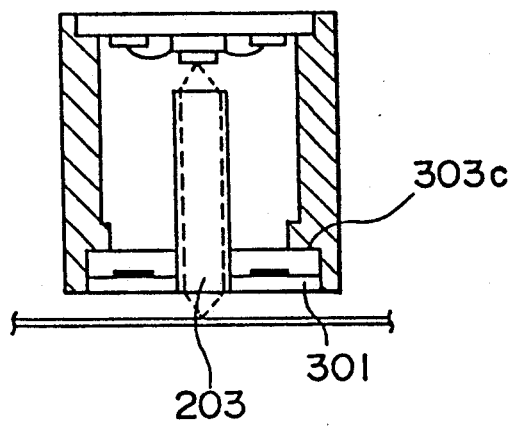
FIGS. 6(a) to 6(c) are sectional views illustrating a fourth embodiment of the read head according to the present invention, which includes several kinds of variant forms.

In the embodiment shown in FIG. 6(a), the side faces of the solid light emitting elements are bonded and secured to the side surfaces of the convergent rod lens array, instead of securing the rod lens array 203 to the protective insulator layer 303c for the upper surfaces of the light emitting elements as shown in FIG. 5. Accordingly, since the light emitting elements are convergent rod lens array which are independent from each other are incorporated integrally with each other by bonding and securing the side surfaces of the light emitting elements to the side surfaces of the convergent rod lens array so as to be handled as a discrete component, thereby it is possible to provide a miniature read head with a high degree of manufacturing accuracy, which can be easily handled.

Figure 6B:
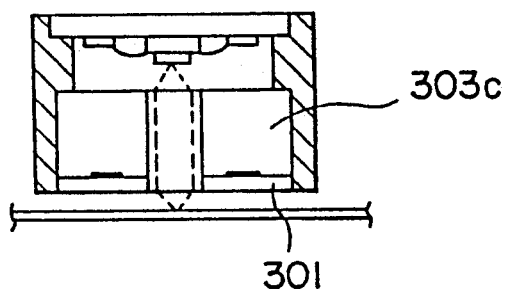

Contrary to the arrangement shown in FIG. 6(a), in the embodiment shown in FIG. 6(b), the thickness of the protective insulator layer for the light emitting elements is made to be equal substantially to the length of the convergent rod lens array. With this arrangement, the convergent rod lens array can be secured with reinforcement in the longitudinal direction, and accordingly, the convergent rod lens array can be easily handled, being prevented from being broken or damaged.

Figure 6C:
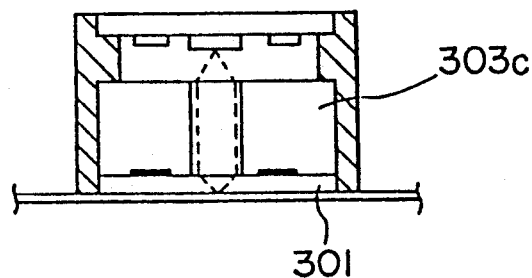
Figure 7:
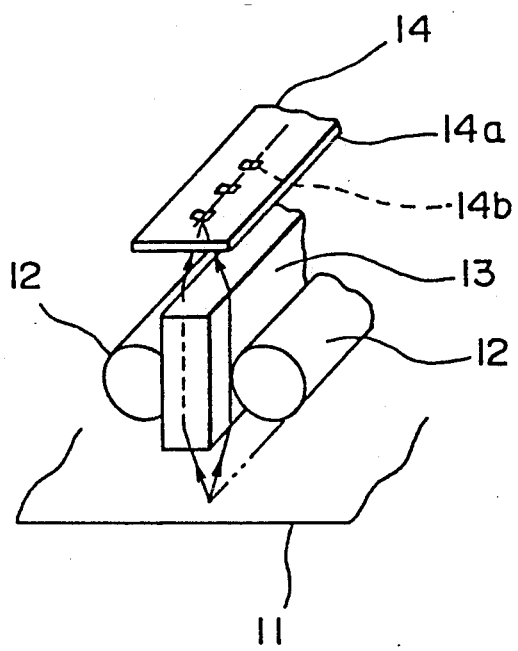
FIG. 7 is a perspective view illustrating an essential part of a conventional read head.

Contrary to the arrangement shown in FIG. 6(b), the embodiment shown in FIG. 6(c) is originated from the arrangement of the embodiment shown in FIG. 4 as a basic structure, that is, the convergent rod lens array is bonded and secured to the upper surface of the protective insulator layer 301 for the light emitting elements, and further, the thickness of the protective insulator layer 303c is increased, similar to the embodiment shown in FIG. 6(b). With this arrangement, as explained in the embodiment shown in FIG. 6(b), the convergent rod lens array can be secured with reinforcement in the longitudinal direction so that it can be easily handled, and accordingly, it is possible to prevent the convergent rod lens array from being broken or damaged, and further to enable the read head to make close contact with a medium to be read, resulting in that the distance between the medium to be read and the light source becomes shorter, thereby the illumination intensity at a point to be picked up on the medium can be made to be higher than that obtained by the embodiment shown in FIG. 6(b).

Although the invention has been explained in the various embodiment forms in which the EL light emitting elements are used as the solid light emitting elements as a light source, the light emitting elements should not be limited to the EL light emitting elements, and accordingly, other light emitting elements such as a plasma display, a fluorescent character display tube and the like can be used therefor if it has a thin thickness.

What is claimed is:

1. A read head comprising:
   a plurality of photoelectric conversion type light receiving element arrays arranged in a longitudinal direction on a substrate, for reading a medium;
   a convergent rod lens array arranged adjacent to said plurality of light receiving element arrays, and having a script side end face; and
   a solid light emitting element of a surface emission type arranged adjacent to the script side end face of said convergent rod lens array, said solid light emitting element continuously covering the convergent rod lens array along the longitudinal direction.

2. A read head as set forth in claim 1, wherein said solid light emitting element is laid on both sides of said convergent rod lens array.

3. A read head as set forth in claim 2, wherein said solid light emitting element has a thickness substantially equal to that of said convergent rod lens array.

4. A read head as set forth in claim 1, wherein said substrate on which said light receiving element arrays are arranged has surrounding support members, the convergent rod lens array and the solid light emitting element being attached to said surrounding support members, respectively.

5. A read head as set forth in claim 1, wherein the solid light emitting element is used as a support member for said convergent type rod lens array, and is attached to a surrounding support member.

6. A read head as set forth in claim 5, wherein the solid light emitting element has a thickness substantially equal to that of said convergent rod lens array.

7. A read head as set forth in claim 1, wherein said convergent rod lens array is attached to a transparent glass pane for protecting said solid light emitting element, said convergent rod lens array being supported on both sides by said solid light emitting element, and wherein said solid light emitting element and said transparent glass pane are attached to a surrounding support member.

8. A read head as set forth in claim 1, wherein said convergent rod lens array is used as a support member for the solid light emitting element and is attached to a surrounding support member.

9. A read head as set forth in claim 1, wherein said solid light emitting element has a linear form which is continuous at least by a length corresponding to a width of a script to be read.

10. A read head as set forth in claim 1, wherein said convergent rod lens array having an optic axis is attached on said solid light emitting element and wherein light emitters on the solid light emitting element extend toward the optical axis, the optical axis being positioned to receive light from said light emitters.

11. A read head comprising:
    photoelectric conversion type light receiving element arrays arranged on a substrate for reading a medium, the substrate being supported by surrounding support members;
    a convergent rod lens array arranged adjacent to said light receiving element arrays and having a script side end face, the convergent rod lens array being supported by lens array supporting members projecting from the surrounding support members; and
    a solid light emitting element of a surface emission type arranged in the vicinity of the script side end face of said convergent rod lens array;
    said light receiving element arrays being surrounded by and sealed by the substrate, the surrounding support members, the convergent rod lens array, and the lens array supporting members.

12. A read head as set forth in claim 11, wherein said light receiving element arrays are surrounded by said substrate, said surrounding support members, said convergent rod lens array and said solid light emitting element, the light receiving element arrays being surrounded and sealed by the substrate and the solid light emitting element supporting the convergent rod lens array.

* * * * *